US009591504B2

United States Patent
Tanaka et al.

(10) Patent No.: US 9,591,504 B2
(45) Date of Patent: Mar. 7, 2017

(54) NETWORK MONITORING SYSTEM

(71) Applicant: FUJITSU LIMITED, Kawasaki-shi, Kanagawa (JP)

(72) Inventors: Akira Tanaka, Kawasaki (JP); Naoya Kohmura, Kawasaki (JP); Kazuo Mizuta, Miyaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/171,068

(22) Filed: Feb. 3, 2014

(65) Prior Publication Data

US 2014/0247735 A1  Sep. 4, 2014

(30) Foreign Application Priority Data

Mar. 4, 2013  (JP) ................................ 2013-041567

(51) Int. Cl.
*H04L 12/26*  (2006.01)
*H04W 24/10*  (2009.01)
*H04W 24/04*  (2009.01)

(52) U.S. Cl.
CPC ............ *H04W 24/10* (2013.01); *H04W 24/04* (2013.01)

(58) Field of Classification Search
None
See application file for complete search history.

(56) References Cited

U.S. PATENT DOCUMENTS

| 6,144,635 A * | 11/2000 | Nakagawa .......... H04L 49/3081 370/229 |
| 2006/0176827 A1* | 8/2006 | Lehew ................ H04L 12/2602 370/252 |
| 2008/0095153 A1 | 4/2008 | Fukunaga et al. |

(Continued)

FOREIGN PATENT DOCUMENTS

| JP | 10-336276 | 12/1998 |
| JP | 2013-024235 | 2/2003 |

(Continued)

OTHER PUBLICATIONS

Notice of Reason for Rejection, dated Jul. 5, 2016, in corresponding Japanese Application No. 2013-041567 (5 pp.).

(Continued)

*Primary Examiner* — Kwang B Yao
*Assistant Examiner* — Hardikkumar Patel
(74) *Attorney, Agent, or Firm* — Staas & Halsey LLP (57) ABSTRACT

A monitoring apparatus includes a processor configured to capture a network transmission signal from a monitoring location in a monitoring target network; specify each of a plurality of sessions based on session specifying information contained in the captured network transmission signal; analyze, for specified each of the sessions, the network transmission signal and measure a quality index; transfer the quality index of each of the sessions, which is measured every predetermined period of time, as a quality measurement result to an aggregation apparatus until a predetermined threshold value of a processing capability is reached; and stop, when the predetermined threshold value of the processing capability is exceeded, measuring the quality index of one of the sessions in a high-load state, and in a next cycle, perform the measurement on one of the sessions in the high-load state.

9 Claims, 9 Drawing Sheets

(56) References Cited

U.S. PATENT DOCUMENTS

| | | | |
|---|---|---|---|
| 2008/0186866 A1 | 8/2008 | Morinaga et al. | |
| 2008/0205378 A1* | 8/2008 | Wyss | H04L 63/00 370/352 |
| 2008/0298271 A1 | 12/2008 | Morinaga et al. | |
| 2011/0072178 A1* | 3/2011 | Mace | G06F 13/161 710/244 |
| 2013/0044618 A1* | 2/2013 | Okada | H04L 43/0858 370/252 |
| 2013/0114446 A1* | 5/2013 | Liu | H04W 24/10 370/252 |

FOREIGN PATENT DOCUMENTS

| | | |
|---|---|---|
| JP | 2008-092069 | 4/2008 |
| JP | 2008-104027 | 5/2008 |
| JP | 2008-219869 | 9/2008 |
| JP | 2011-176586 | 9/2011 |
| JP | 2012-169831 | 9/2012 |
| JP | 2013-024235 | 2/2013 |

OTHER PUBLICATIONS

Office Action, dated Nov. 2, 2016, in Chinese Application No. 201410056412.7 (22 pp.).

* cited by examiner

STATE TRANSITION OF SESSION MANAGEMENT TABLE (AT TIME OF STEADY LOAD)

INITIAL STATE (00:01:00)

THROUGHPUT THRESHOLD VALUE : 100 ( > TOTAL THROUGHPUT : 0)

| SESSION ID | SESSION START TIME | TRANSMISSION SOURCE IP ADDRESS | DESTINATION IP ADDRESS | THROUGHPUT (PER SECOND) | MEASUREMENT STATE |
|---|---|---|---|---|---|
| 001 | 00:00:00 | A | I | 0 | 0 |
| 002 | 00:00:02 | B | J | 0 | 0 |
| 003 | 00:00:05 | C | I | 0 | 0 |
| 004 | 00:00:10 | D | J | 0 | 0 |
| 005 | 00:00:20 | E | I | 0 | 0 |
| 006 | 00:00:25 | F | J | 0 | 0 |
| 007 | 00:00:30 | G | I | 0 | 0 |
| 008 | 00:00:40 | H | J | 0 | 0 |

MEASUREMENT STATE
0 : NOT MEASURED
1 : MEASUREMENT IN PROGRESS
2 : MEASUREMENT FINISHED

FIG. 5B

STATE TRANSITION OF SESSION MANAGEMENT TABLE (AT TIME OF STEADY LOAD)

MEASUREMENT IN PROGRESS (00:01:30)

THROUGHPUT THRESHOLD VALUE : 100 ( = TOTAL THROUGHPUT : 100)

| SESSION ID | SESSION START TIME | TRANSMISSION SOURCE IP ADDRESS | DESTINATION IP ADDRESS | THROUGHPUT (PER SECOND) | MEASUREMENT STATE |
|---|---|---|---|---|---|
| 001 | 00:00:00 | A | I | 20 | 1 |
| 002 | 00:00:02 | B | J | 40 | 1 |
| 003 | 00:00:05 | C | I | 40 | 1 |
| 004 | 00:00:10 | D | J | 0 | 0 |
| 005 | 00:00:20 | E | I | 0 | 0 |
| 006 | 00:00:25 | F | J | 0 | 0 |
| 007 | 00:00:30 | G | I | 0 | 0 |
| 008 | 00:00:40 | H | J | 0 | 0 |

PERFORM MEASUREMENT UNTIL TOTAL THROUGHPUT REACHES THRESHOLD VALUE

← MEASUREMENT IS TO BE STARTED AT THIS SESSION IN NEXT CYCLE

FIG. 5C

STATE TRANSITION OF SESSION MANAGEMENT TABLE (AT TIME OF STEADY LOAD)
MEASUREMENT FINISHED FOR ALL SESSIONS (00:04:00)
THROUGHPUT THRESHOLD VALUE : 100 ( > TOTAL THROUGHPUT : 0)

| SESSION ID | SESSION START TIME | TRANSMISSION SOURCE IP ADDRESS | DESTINATION IP ADDRESS | THROUGHPUT (PER SECOND) | MEASUREMENT STATE | |
|---|---|---|---|---|---|---|
| 001 | 00:00:00 | A | I | 0 | 2 | ⎫ FIRST CYCLE |
| 002 | 00:00:02 | B | J | 0 | 2 | ⎬ FINISHED |
| 003 | 00:00:05 | C | I | 0 | 2 | ⎭ |
| 004 | 00:00:10 | D | J | 0 | 2 | ⎫ SECOND CYCLE |
| 005 | 00:00:20 | E | I | 0 | 2 | ⎬ FINISHED |
| 006 | 00:00:25 | F | J | 0 | 2 | ⎭ |
| 007 | 00:00:30 | G | I | 0 | 2 | ⎱ THIRD CYCLE |
| 008 | 00:00:40 | H | J | 0 | 2 | ⎰ FINISHED |

FIG. 6A

STATE TRANSITION OF SESSION MANAGEMENT TABLE (BEFORE HIGH-LOAD STATE OCCURS)
MEASUREMENT IN PROGRESS (00:01:30)
THROUGHPUT THRESHOLD VALUE : 100 ( = TOTAL THROUGHPUT : 100)

| SESSION ID | SESSION START TIME | TRANSMISSION SOURCE IP ADDRESS | DESTINATION IP ADDRESS | THROUGHPUT (PER SECOND) | MEASUREMENT STATE |
|---|---|---|---|---|---|
| 001 | 00:00:00 | A | I | 30 | 1 |
| 002 | 00:00:02 | B | J | 40 | 1 |
| 003 | 00:00:05 | C | I | 30 | 1 |
| 004 | 00:00:10 | D | J | 0 | 0 |
| 005 | 00:00:20 | E | I | 0 | 0 |
| 006 | 00:00:25 | F | J | 0 | 0 |
| 007 | 00:00:30 | G | I | 0 | 0 |
| 008 | 00:00:40 | H | J | 0 | 0 |

FIG. 6B

STATE TRANSITION OF SESSION MANAGEMENT TABLE (WHEN HIGH-LOAD STATE OCCURS)
MEASUREMENT STOPPED (00:01:40)
THROUGHPUT THRESHOLD VALUE : 100 ( < TOTAL THROUGHPUT : 120)

| SESSION ID | SESSION START TIME | TRANSMISSION SOURCE IP ADDRESS | DESTINATION IP ADDRESS | THROUGHPUT (PER SECOND) | MEASUREMENT STATE |
|---|---|---|---|---|---|
| 001 | 00:00:00 | A | I | 30 | 1 |
| 002 | 00:00:02 | B | J | 60 | 1 → 0 ← SET MEASUREMENT STATE TO 0 BECAUSE THRESHOLD VALUE IS EXCEEDED |
| 003 | 00:00:05 | C | I | 30 | 1 |
| 004 | 00:00:10 | D | J | 0 | 0 |
| 005 | 00:00:20 | E | I | 0 | 0 |
| 006 | 00:00:25 | F | J | 0 | 0 |
| 007 | 00:00:30 | G | I | 0 | 0 |
| 008 | 00:00:40 | H | J | 0 | 0 |

FIG. 6C

STATE TRANSITION OF SESSION MANAGEMENT TABLE (AFTER HIGH-LOAD STATE OCCURS)
MEASUREMENT RESUMED (00:02:00)
THROUGHPUT THRESHOLD VALUE : 100 ( = TOTAL THROUGHPUT : 100)

| SESSION ID | SESSION START TIME | TRANSMISSION SOURCE IP ADDRESS | DESTINATION IP ADDRESS | THROUGHPUT (PER SECOND) | MEASUREMENT STATE | |
|---|---|---|---|---|---|---|
| 001 | 00:00:00 | A | I | 0 | 2 | |
| 002 | 00:00:02 | B | J | 60 | 1 | ← THIS SESSION IS TO BE MEASURED IN NEXT CYCLE |
| 003 | 00:00:05 | C | I | 0 | 2 | |
| 004 | 00:00:10 | D | J | 10 | 1 | |
| 005 | 00:00:20 | E | I | 30 | 1 | |
| 006 | 00:00:25 | F | J | 0 | 0 | |
| 007 | 00:00:30 | G | I | 0 | 0 | |
| 008 | 00:00:40 | H | J | 0 | 0 | |

NETWORK MONITORING SYSTEM

CROSS-REFERENCE TO RELATED APPLICATION

This application is based upon and claims the benefit of priority of the prior Japanese Patent Application No. JP2013-041567, filed on Mar. 4, 2013, the entire contents of which are incorporated herein by reference.

FIELD

The disclosures made herein relate to a network monitoring system.

BACKGROUND

In recent years, Internet Protocol (IP) integration in a communication network (hereinafter referred to simply as "network") has been promoted and a plurality of communication services having different priorities are thus mixed in the same network, which causes a rapid increase in traffic.

It has become more important for a carrier (telecommunications carrier) having a network apparatus conforming to the IP to understand a service operational status in the network and analyze a cause of an anomaly.

A network operated by such carrier includes a plurality of access networks, which are deployed in respective regions with a core network as its center, and the network has a huge number of access points. In order to analyze network transmission signals in detail, it is necessary to arrange a monitoring apparatus at each position (each monitoring location) in the access network for the purpose of quality measurement and perform the quality measurement comprehensively based on the captured network transmission signals.

The following are related arts to the invention.
[Patent document 1] Japanese Patent Laid-Open Publication No. JP 2008-104027
[Patent document 2] Japanese Patent Laid-Open Publication No. JP 2011-176586

SUMMARY

However, the cost for introducing the monitoring apparatus is increased in proportion to the number of arranged monitoring apparatus, and hence a low-cost (inexpensive) monitoring apparatus is required. There is also a problem in that it becomes difficult to ensure that the quality measurement is performed comprehensively when a further low-cost monitoring apparatus is pursued.

According to an aspect of the disclosures made herein, a monitoring apparatus includes a processor configured to capture a network transmission signal from a monitoring location in a monitoring target network; specify each of a plurality of sessions based on session specifying information contained in the captured network transmission signal; analyze, for specified each of the sessions, the network transmission signal and measure a quality index; transfer the quality index of each of the sessions, which is measured every predetermined period of time, as a quality measurement result to an aggregation apparatus until a predetermined threshold value of a processing capability is reached; and stop, when the predetermined threshold value of the processing capability is exceeded, measuring the quality index of one of the sessions in a high-load state, and in a next cycle, perform the measurement on one of the sessions in the high-load state.

Objects and advantages of the disclosures will be realized and attained by means of the elements and combinations particularly pointed out in the claims.

DESCRIPTION OF EMBODIMENTS

The embodiment of the disclosures made herein will be described below referring to the drawings in detail. The drawings illustrate a preferred embodiment. It should be understood, however, that the embodiment can be implemented by many different embodiments, and is not limited to the embodiment described herein.

[Network Monitoring System]

Figure 1:
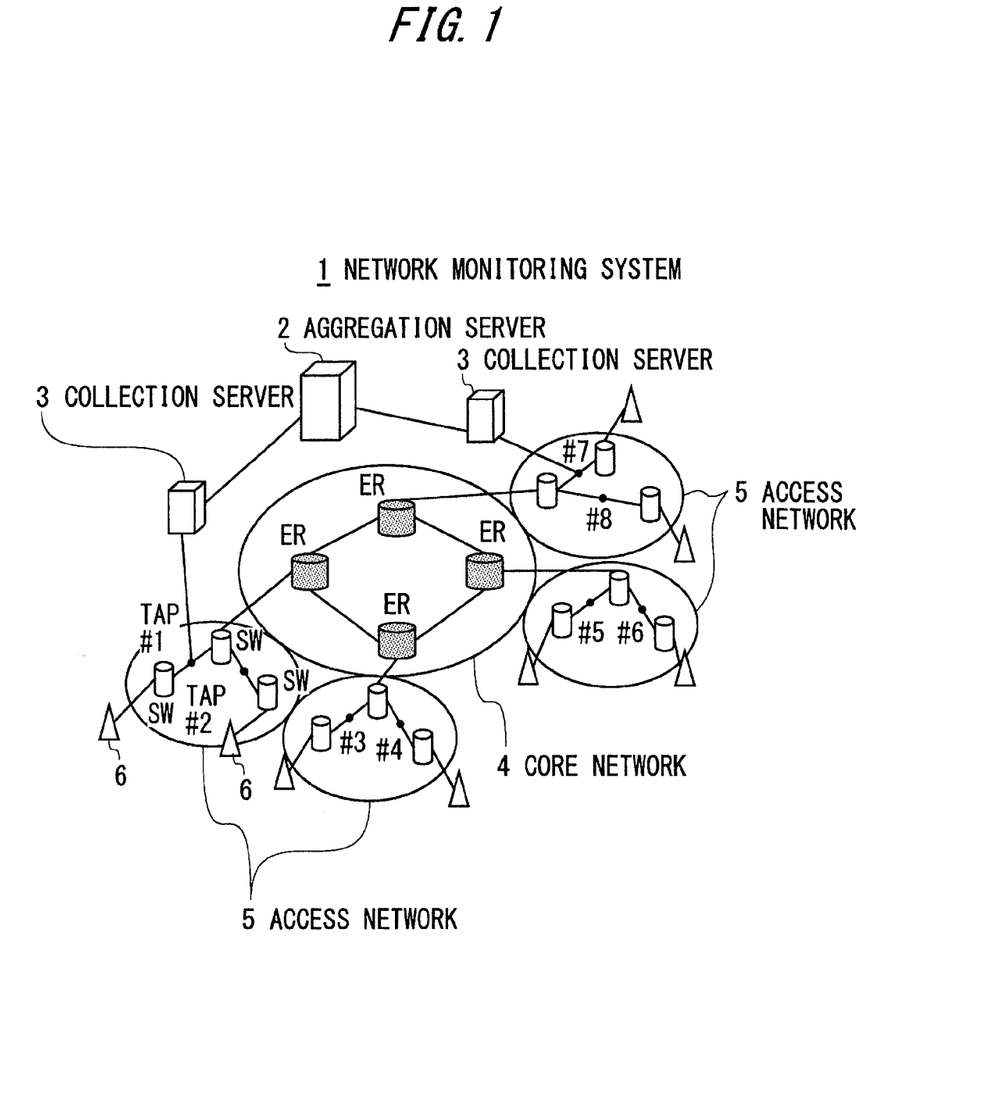
FIG. 1 is a block diagram illustrating a configuration of a system of one embodiment.

Referring to FIG. 1 illustrating a system configuration of one embodiment, a network monitoring system 1 includes an aggregation server 2, a plurality of collection servers 3, a core network 4, and a plurality of access networks 5.

The aggregation server 2 as a central aggregation apparatus aggregates (sums and performs statistical processing on) packet analysis results (quality measurement results) transferred periodically (every one minute in this case) from the plurality of collection servers 3 operating in a time-synchronized manner.

Each of the collection servers 3 as monitoring apparatus, which are arranged for the purpose of quality measurement in a distributed manner so as to correspond to respective monitoring locations, captures, via network transmission signal branching/extracting devices TAP (#1 to #8) inserted and connected between relay switches SW in the access networks 5, transmission data (hereinafter sometimes referred to simply as "packet") having a form of a packet for operation and passing through a network line as a network transmission signal, and then performs packet analysis. For simplicity, FIG. 1 illustrates only the collection servers 3 corresponding to the network transmission signal branching/extracting devices TAP (#1 and #7) as an example.

The core network 4 includes a plurality of Internet Protocol (IP) routers such as edge routers ER as network apparatuses, and connects the respective edge routers ER to the access networks 5.

Each of the access networks 5 includes the plurality of relay switches SW such as a layer 2 (L2) switch and a layer 3 (L3) switch as the network apparatuses and the plurality of the network transmission signal branching/extracting devices (hereinafter sometimes referred to simply as "tap") TAP.

In each of the access networks 5, the arrangement positions of the taps TAP (#1 to #8), which are each inserted and connected between the relay switches SW and branch and extract the network transmission signal (hereinafter sometimes referred to simply as "packet") in a replicated state, correspond to quality measurement locations in respective monitoring target networks.

Each of the access networks 5 accommodates a base station controller (radio network controller (RNC)), a radio base station apparatus (evolved Node B (eNB)), or a gateway (GW) as a network apparatus 6 forming various forms of networks such as a mobile wireless communication network for Long Term Evolution (LTE) or a wireless local area network (WLAN).

In the above-mentioned network monitoring system 1, the core network 4, the access networks 5, and the network apparatus 6 are facilities operated by a telecommunications carrier (carrier).

(Monitoring Target Network)

Figure 2:
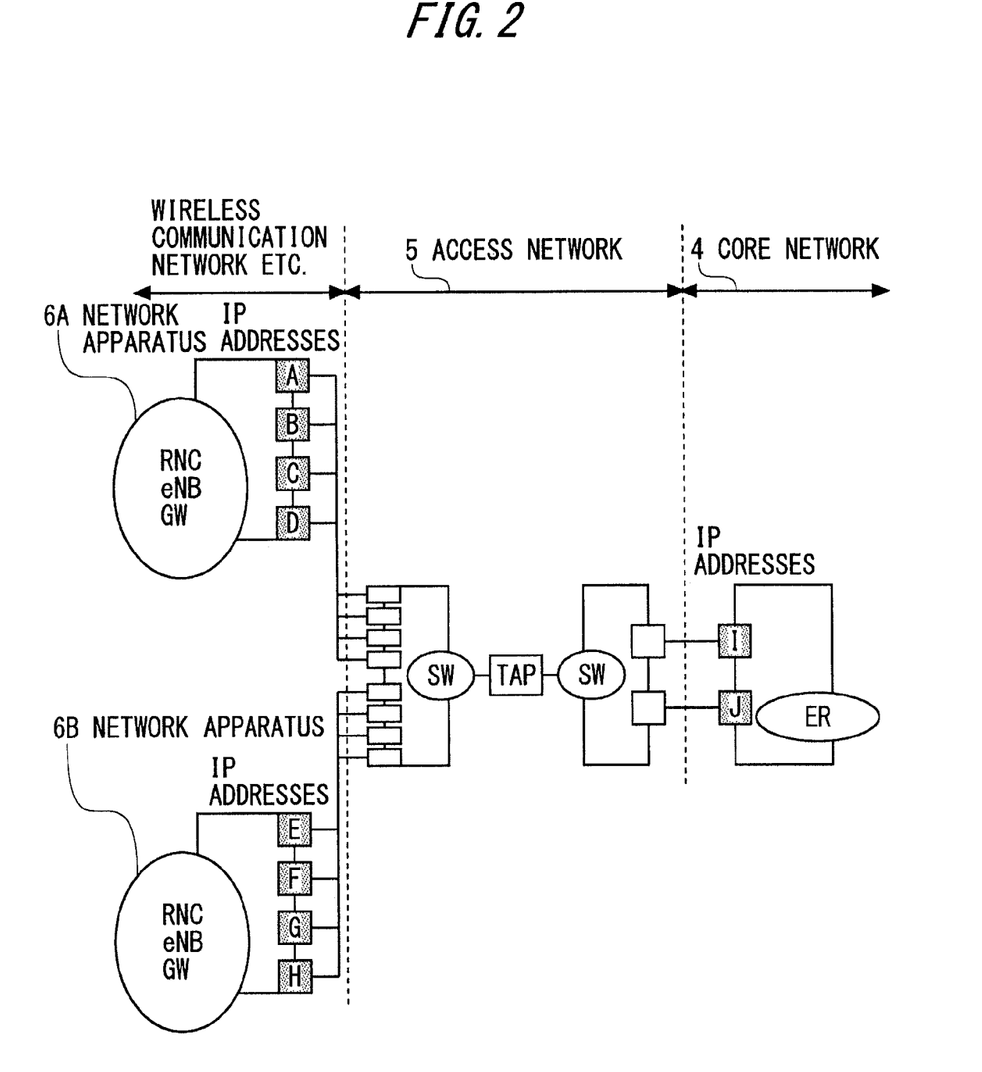
FIG. 2 is a diagram illustrating a monitoring target network in the system of the one embodiment.

FIG. 2 is a diagram illustrating the monitoring target network in the network monitoring system 1 of the one embodiment illustrated in FIG. 1.

In one access network 5, the arrangement position of the tap TAP (for example, #1) inserted and connected between the relay switches SW corresponds to the quality measurement location in the monitoring target network.

One of the relay switches SW is connected via the network line to a network apparatus 6A having IP addresses corresponding to four respective ports A, B, C, and D, and is also connected via the network line to a network apparatus 6B having IP addresses corresponding to respective four ports E, F, G, and H.

The other of the relay switches SW is connected via the network line to the edge router ER as the network apparatus in the core network 4 having IP addresses corresponding to two respective ports I and J.

As described in detail later, in the monitoring target network, respective connections each specified by a combination of one of IP addresses A to D and E to H of the network apparatuses 6A and 6B and one of IP addresses I and J of the edge router ER are managed as sessions by the collection server 3.

(Collection Server)

Figure 3:
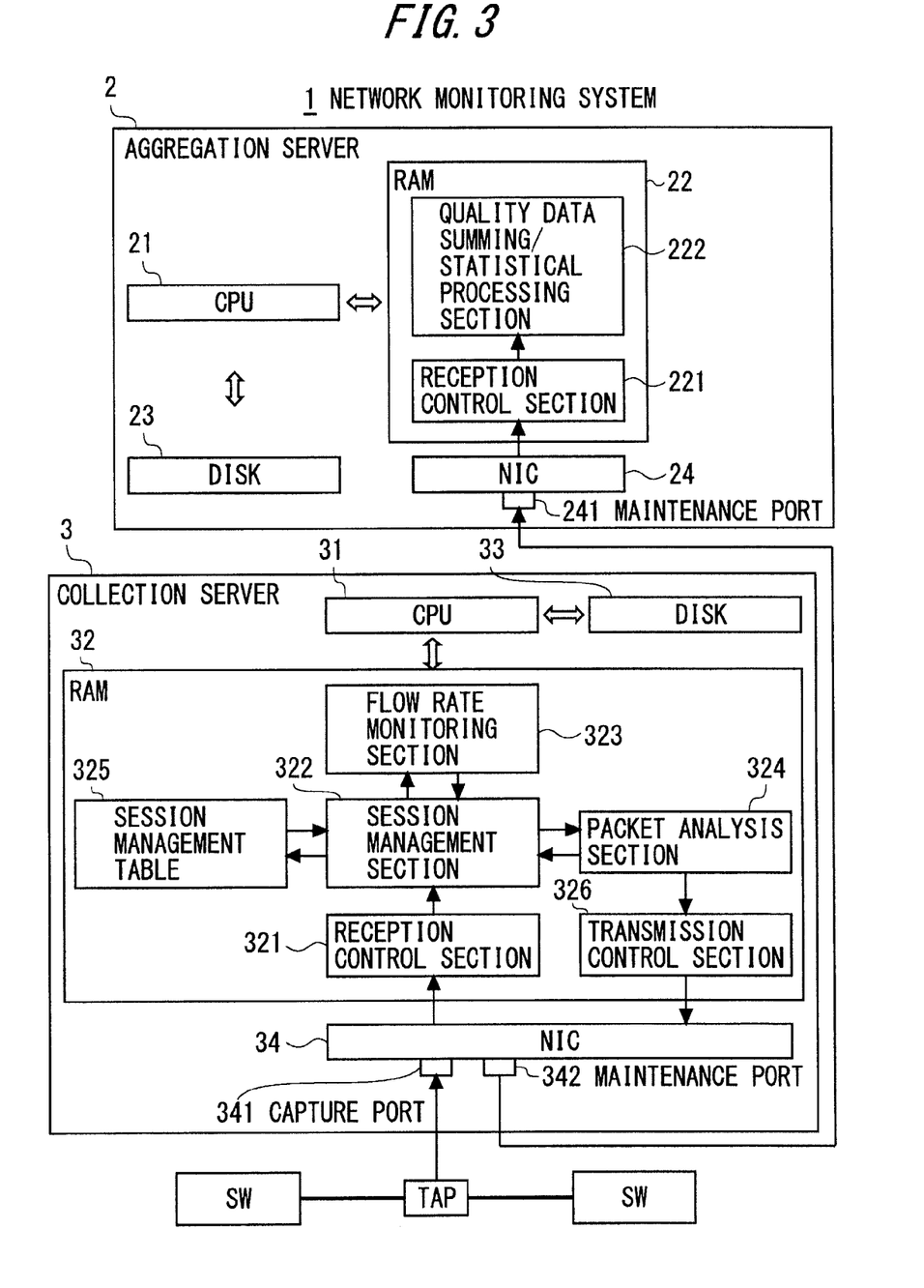
FIG. 3 is a block diagram illustrating detailed configurations of a collection server and an aggregation server in the system of the one embodiment.

Each of the collection servers 3 as the monitoring apparatus, which are arranged in a distributed manner at respective monitoring locations (respective quality measurement locations), includes the following components as a hardware configuration as illustrated in FIG. 3. Specifically, each of the collection servers 3 includes a central processing unit (CPU) 31 as a processor, a random access memory (RAM) 32 as a working memory, and a read only memory (ROM) (not shown) having stored thereon a boot program for booting.

The collection server 3 further includes a disk 33 as a non-volatile flash memory for storing an operating system (OS), various types of application programs, and various types of information (including data) in a rewritable manner and a network interface card (NIC) 34 as a network interface.

In order to logically implement a quality measurement processing function to be described in detail later, a control program (quality measurement control program) is installed on the disk 33 as the application program in the collection server 3. In addition, in the collection server 3, the CPU 31 constantly expands the control program in the RAM 32 and executes the control program as a resident program.

To describe in more detail, the collection server 3 includes a reception control section 321, a session management section 322, a flow rate monitoring section 323, a packet analysis section 324, a session management table 325, and a transmission control section 326 as functional components.

The reception control section 321 operating as a capture engine receives, that is, captures the packet for operation passing through the network line via the tap TAP, which is inserted and connected between the relay switches SW in the access network 5 and branches and extracts the packet for operation in a replicated state, and further via a capture port 341 of the NIC 34.

The session management section 322 uses the session management table 325 to manage the session for each packet captured by the reception control section 321.

The flow rate monitoring section 323 monitors a throughput that is analyzable depending on a packet analysis processing capability of the packet analysis section 324, that is, a packet transfer amount (packet count per unit time (packet per second (PPS))), and notifies the session management section 322 of the monitored amount. When the transfer amount of packets exceeds a predetermined threshold value of the processing capability, the session management section 322 stops the measurement of those packets.

The packet analysis section 324 identifies the session to be measured based on the notification sent from the session management section 322, and performs quality measurement periodically, that is, every predetermined time interval (every one minute in this case).

The qualities to be measured for the monitoring target network include a communication quality and a connection quality. Examples of an item to be measured as the communication quality include the throughput (packet transfer amount) and a data amount ((packet count)×(packet length)). Examples of an item to be measured as the connection quality include a connection request count for establishing the session, a connection completion count, and a concurrent session count. Further, protocols to be analyzed include the Transmission Control Protocol (TCP), the User Datagram Protocol (UDP), and an upper-layer protocol. The packet analysis section 324 analyzes a necessary item to be measured (quality index) based on quality data aggregated by the aggregation server 2.

Figure 5A:
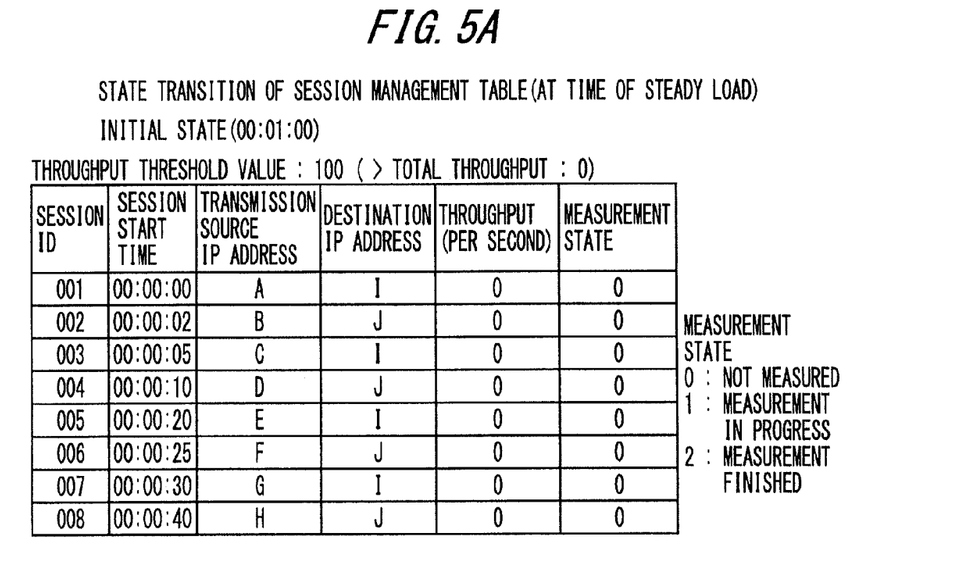
FIG. 5A is a table showing a state transition (initial state) of a session management table at the time of a steady load.

The session management table 325 retains (stores), for each captured packet, a session start time, a transmission source IP address, a destination IP address, a throughput per second, and a measurement state (0: not measured, 1: measurement in progress, 2: measurement finished) in association with one another with use of session identification information (ID) as key information (see, for example, FIG. 5A).

The session ID, the session start time, the transmission source IP address, the destination IP address, the throughput per second, and the measurement state stored in the session management table 325 are set (automatically set) by the session management section 322 when the quality measurement processing is performed.

A combination of the transmission source IP address and the destination IP address as session specifying information for specifying the session is extracted from the captured packet (to be exact, a header portion of the packet) by the session management section 322, and stored in the session management table 325 in association with the session ID. The session management section 322 sets a time at which each session is registered in the session management table 325 as the session start time for the session. As described in detail later, for that purpose, the session management section 322 learns the session existing in the monitoring target network for a predetermined period of time, and stores the session in advance in the session management table 325.

The transmission control section 326 transmits the quality index for each measurement result from a maintenance port 342 of the NIC 34 to the aggregation server 2 though the network line.

(Aggregation Server)

The aggregation server 2 as the central aggregation apparatus includes the following components as a hardware configuration as illustrated in FIG. 3. Specifically, the aggregation server 2 includes a CPU 21 as a processor, a RAM 22 as a working memory, and a ROM (not shown) having stored thereon a boot program for booting.

The aggregation server 2 further includes a disk 23 as a non-volatile flash memory for storing an OS, various types of application programs, and various types of information (including data) in a rewritable manner and an NIC 24 as a network interface.

In order to logically implement an aggregation processing function for aggregating the quality measurement results, a control program (aggregation control program) is installed on the disk 23 as the application program in the aggregation server 2. In addition, in the aggregation server 2, the CPU 21 constantly expands the control program in the RAM 22 and executes the control program as a resident program.

To describe in more detail, the aggregation server 2 includes a reception control section 221 and a quality data summing/statistical processing section 222 as functional components.

In the aggregation server 2, the reception control section 221 periodically (every one minute in this case) receives, via a maintenance port 241 of the NIC 24, the quality indices from the respective collection servers 3 as the quality measurement results. Based on the quality measurement results received by the reception control section 221, the quality data summing/statistical processing section 222 sums and performs the statistical processing on the quality measurement results.

A network operator can understand a network quality status of the entire access network 5 in real time by analyzing an aggregation result, which is a result of the summing and statistical processing performed by the aggregation server 2. As application examples of data obtained by performing the summing and statistical processing, visualization of transition of the measured values and introduction of a mechanism for issuing an alarm in response to detection of outliers are conceivable.

[Quality Measurement Processing]

Next, a description is given of an example of the quality measurement processing in the network monitoring system 1 of the one embodiment with reference to FIGS. 1, 2, and 3 and related drawings.

Figure 4A:
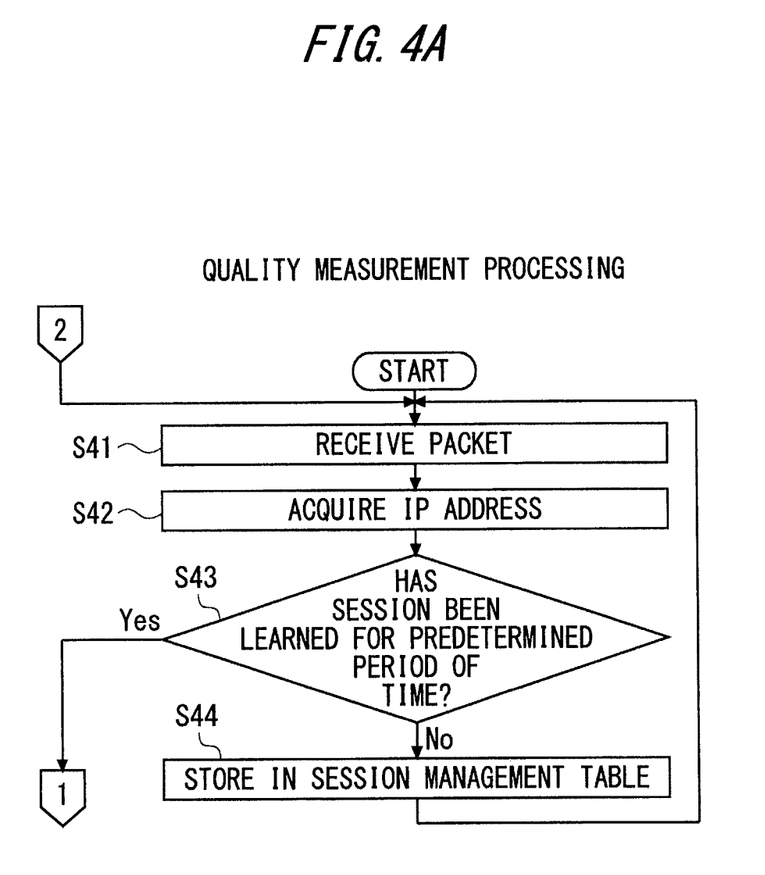
FIG. 4A is a flowchart illustrating quality measurement processing performed in the collection server.
Figure 4B:
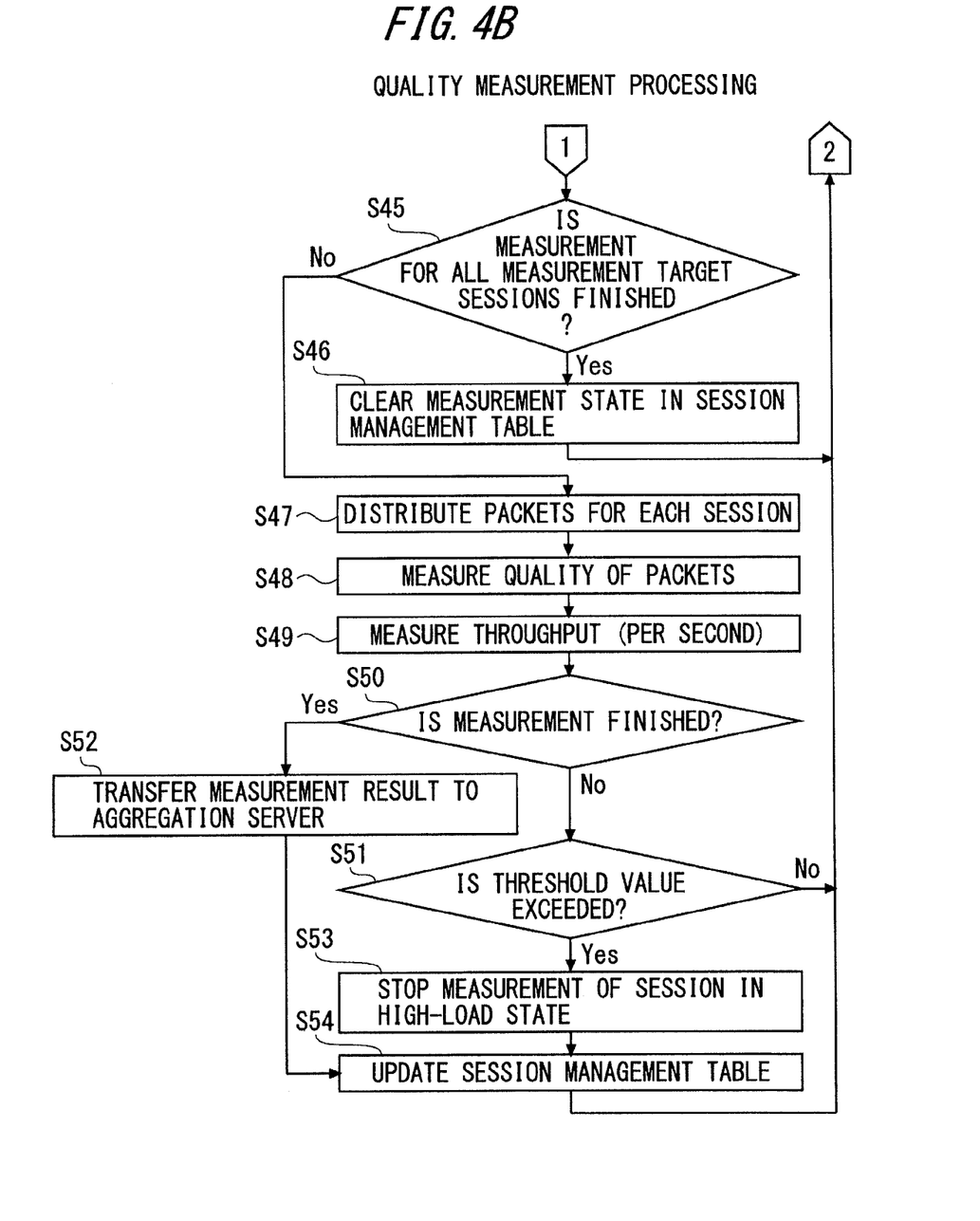
FIG. 4B is a flowchart illustrating the quality measurement processing performed in the collection server.

FIGS. 4A and 4B illustrate a flow of the quality measurement processing performed by the collection server 3.

Figure 5B:
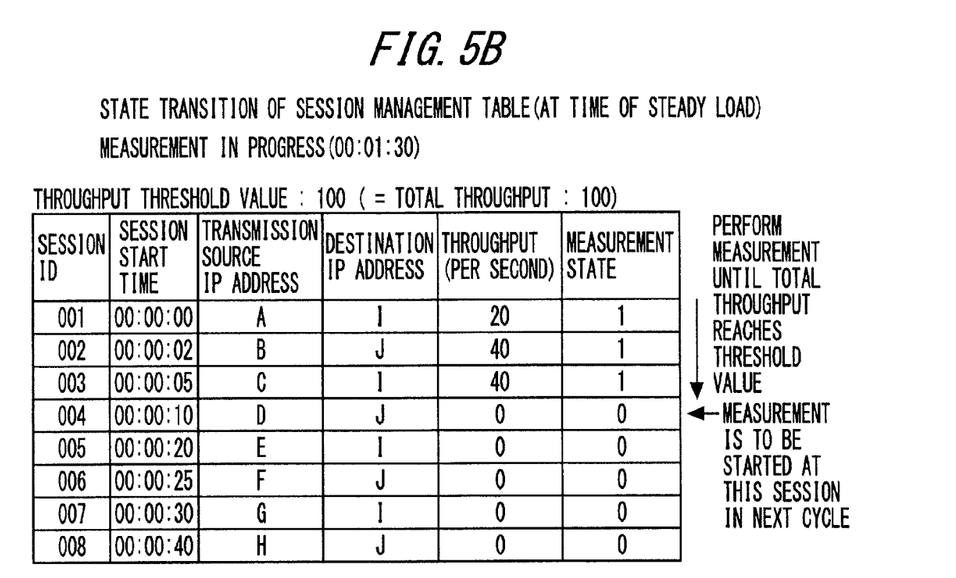
FIG. 5B is a table showing the state transition (measurement in progress) of the session management table at the time of the steady load.
Figure 5C:
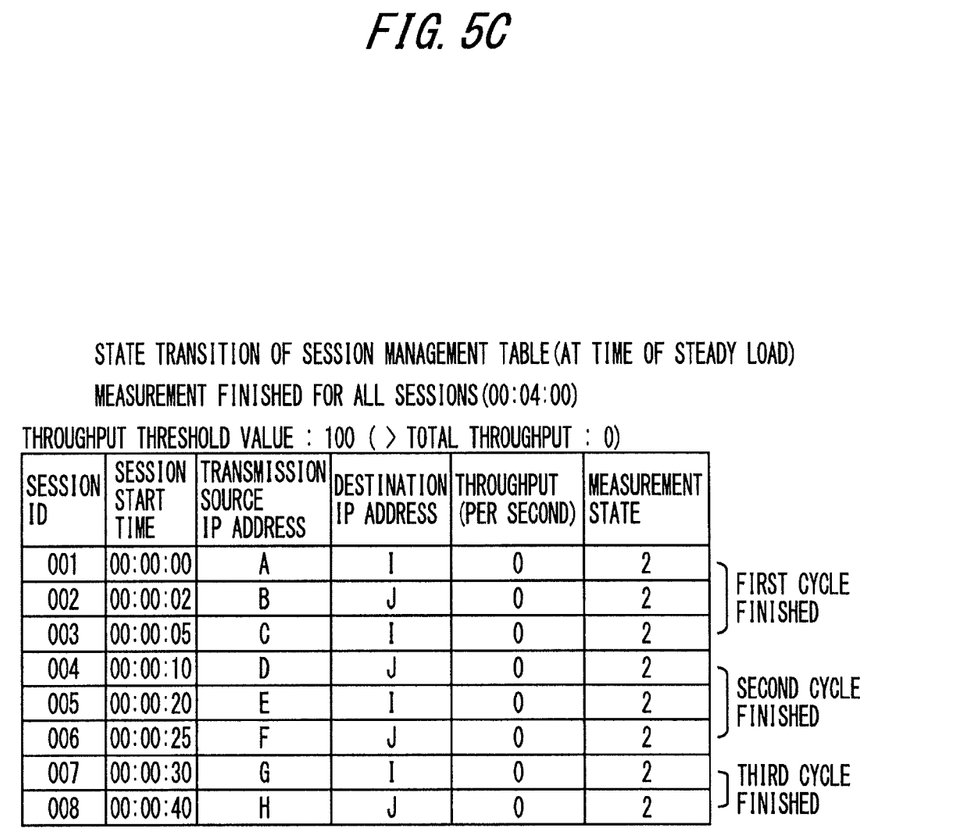
FIG. 5C is a table showing the state transition (measurement finished for all sessions) of the session management table at the time of the steady load.

FIGS. 5A, 5B, and 5C show state transitions of the session management table 325 at the time of a steady load. FIG. 5A shows the session management table in an initial state, which is obtained after learning is performed for a predetermined period of time, and the measurement states of a session ID "001" to a session ID "008" are each set to "0" meaning "not measured". When the packet is received, the measurement is started based on a measurement cycle, and the measurement state of the received session is set to "1" meaning "measurement in progress" (see FIG. 5B). Measurement target sessions are switched periodically, and the measurement state of the session for which the measurement is finished is set to "2" meaning "measurement finished". When the measurement states of all measurement target sessions are set to "2" meaning "measurement finished", the measurement is completed (see FIG. 5C).

Figure 6A:
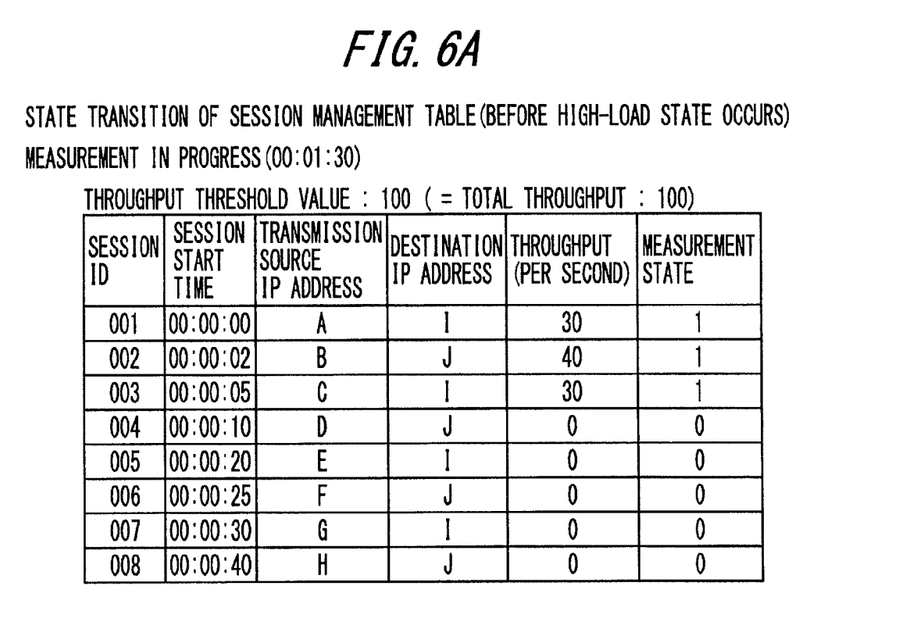
FIG. 6A is a table showing the state transition (measurement in progress) of the session management table before a high-load state occurs.
Figure 6B:
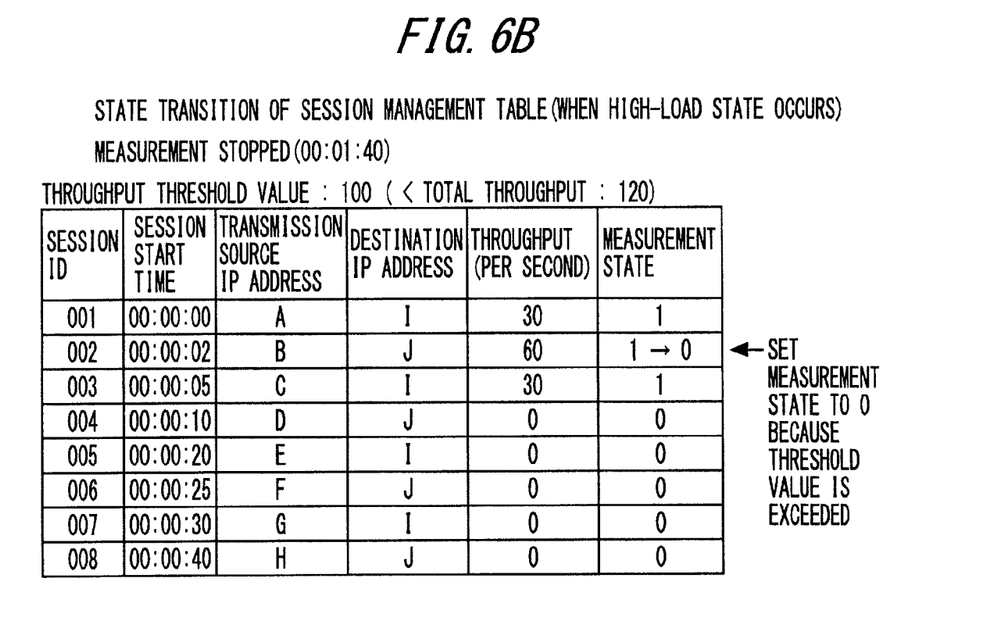
FIG. 6B is a table showing the state transition (measurement stopped) of the session management table when the high-load state occurs.
Figure 6C:
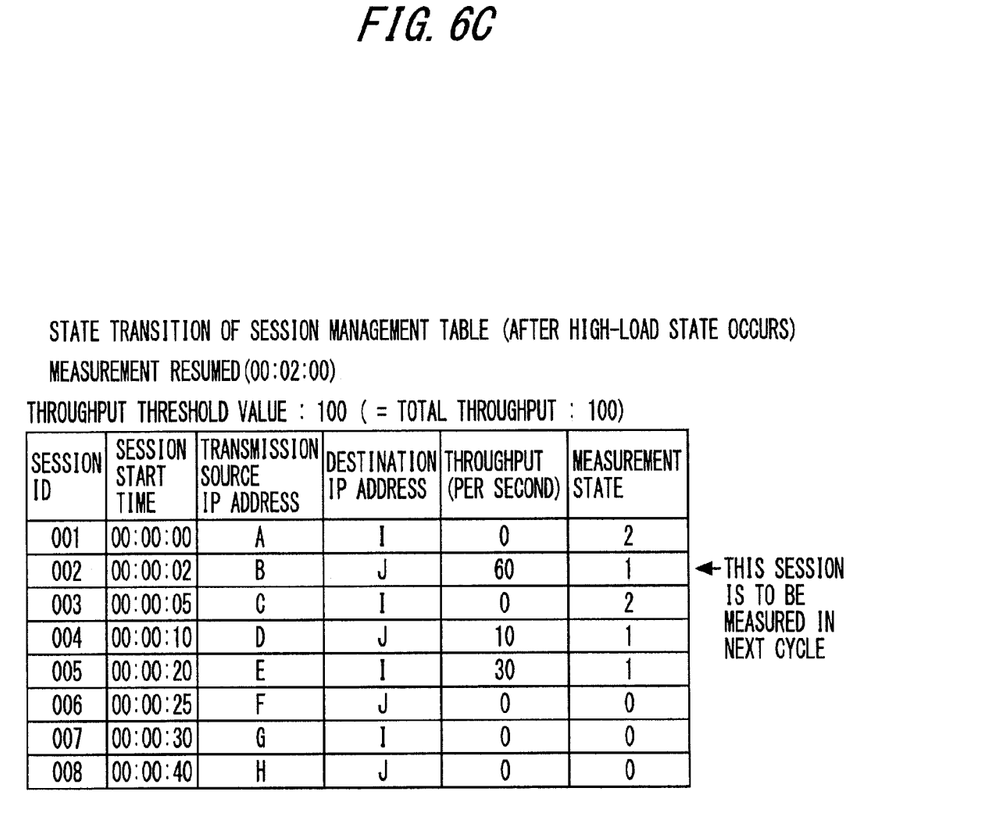
FIG. 6C is a table showing the state transition (measurement resumed) of the session management table after the high-load state occurs.

FIGS. 6A, 6B, and 6C show state transitions of the session management table 325 before a high-load state occurs, when the high-load state occurs, and after the high-load state occurs, respectively. When a total throughput per second exceeds the throughput threshold value during the measurement (FIG. 6A), the measurement of the packet relating to the session having the highest throughput per second is stopped, and the measurement state of the session is updated to "0" meaning "not measured" (see FIG. 6B). The session whose measurement state has been set to "not measured" is to be measured in the next cycle (see FIG. 6C). This processing is repeated until all sessions have "2" meaning "measurement finished" as their measurement states. With this, it is possible to ensure that the measurement is performed comprehensively on the measurement target sessions.

A description is given of this processing in detail. In the network monitoring system 1, the reception control section 321 of the collection server 3 receives (captures) via the NIC 34 the packet extracted by the tap TAP, which is inserted and connected between the relay switches SW corresponding to the monitoring location of the monitoring target network and branches and extracts the packet (IP packet) for operation in a replicated state (S41 of FIG. 4A).

The session management section 322 acquires the transmission source IP address and the destination IP address as information necessary for specifying the session based on the packet received by the reception control section 321. At this time, in addition to those addresses, the session management section 322 acquires as necessary a media access control (MAC) address, a port number, a protocol number, and the like from the packet (S42 of FIG. 4A).

Based on the value of an already-learned flag (not shown) (already learned: 1/not learned yet: 0) stored in the session management table 325, the session management section 322 determines whether or not the existing session has been learned for the predetermined period of time (one minute, for example) (S43 of FIG. 4A).

When the determination is negative in Step S43, the session management section 322 stores the acquired transmission source IP address and destination IP address in the session management table 325 along with the session ID and the session start time (S44 of FIG. 4A).

When Steps S41 to S44 are repeated for the predetermined period of time, the value of the already-learned flag is updated by the session management section 322 to "1" meaning "already learned". Moreover, the session management table 325 having the state transition (at the time of the steady load, initial state) shown in FIG. 5A is generated as a learning result.

As shown in FIG. 5A, the sessions having the session ID "001" to the session ID "008" are stored in the session management table 325 in the initial state (time: 00:01:00). The session management section 322 sets the session management table 325 so that the measurement states of the respective sessions having the session ID "001" to the session ID "008" each indicate "0" meaning "not measured" and the throughputs per second of those sessions each indicate an initial value of "0".

When the determination is positive in Step S43, the session management section 322 refers to the session management table 325 to determine whether or not the measurement states of the measurement target sessions are all "2" meaning "measurement finished" (S45 of FIG. 4B).

When the determination is positive in Step S45, the session management section 322 clears the measurement state ("2" meaning "measurement finished") in the session management table 325 (see FIG. 5C), in other words, sets the measurement state to "0" meaning the not-measured state (S46 of FIG. 4B).

When the determination is negative in Step S45, the session management section 322 distributes the packets for each session, and stores the packets in its own packet accumulation buffers (first-in-first-out (FIFO) queues) (S47 of FIG. 4B).

The packet analysis section 324 identifies the measurement target session based on the notification sent from the session management section 322, and performs quality measurement on the packets stored in the packet accumulation buffer every one minute (S48 of FIG. 4B).

Moreover, in the quality measurement, the packet analysis section 324 measures the throughput per second for each session and notifies the session management section 322 of the measured throughput per second. The session management section 322 stores the throughput per second for each session that the session management section 322 is notified of in the session management table 325 in association with the session ID (S49 of FIG. 4B). With this, the session management table 325 having the state transition (at the time of the steady load, measurement in progress) shown in FIG. 5B is generated.

As shown in FIG. 5B, the sessions having the session ID "001" to the session ID "008" are stored in the session management table 325 having "measurement in progress" as the state transition (time: 00:01:30). The session management section 322 sets the session management table 325 so that the measurement states of the respective sessions having the session IDs "001", "002", and "003" each indicate "1" meaning "measurement in progress" and the throughputs per second of those sessions indicate "20", "40", and "40", respectively.

The session management section 322 determines whether or not the predetermined period of time (one minute in this case) has been reached as a measurement finishing condition (S50 of FIG. 4B).

The flow rate monitoring section 323 acquires the throughput per second for each session from the session management section 322, and constantly monitors whether or not the total throughput per second exceeds the predetermined threshold value of the processing capability (throughput threshold value of 100 in this case). After the determination is negative in Step S50, the processing flow returns to Step S41 at the time of the steady load, which is a period of time until the total throughput per second reaches the throughput threshold value, and the measurement is continuously performed (S51 of FIG. 4B).

When the determination is positive in Step S50, the packet analysis section 324 notifies the transmission control section 326 of the quality measurement result of the packets for which the measurement is finished. The transmission control section 326 transmits, via the maintenance port 342 of the NIC 34, the quality measurement result measured by the packet analysis section 324 to the aggregation server 2 (S52 of FIG. 4B).

After Step S52, the session management section 322 updates the session management table 325, and the processing flow returns to Step S41 (S54 of FIG. 4B).

When the measurement is finished for all sessions, the session management table 325 having the state transition (at the time of the steady load, measurement finished for all sessions) shown in FIG. 5C is generated.

As shown in FIG. 5C, the session management section 322 updates the session management table 325 having "measurement finished for all sessions" (time: 00:04:00) as the state transition so that the measurement states of the respective sessions having the session ID "001" to the session ID "008" each indicate "2" meaning "measurement finished" and the throughputs per second of those sessions each indicate the initial value of "0".

It can be understood from FIG. 5C that the measurement for all sessions having the session ID "001" to the session ID "008" is completed in three minutes corresponding to three cycles.

Further, after the determination is negative in Step S50, when determining that the total throughput per second (120 in this case) exceeds the throughput threshold value (100 in this case) (that is, when the high-load state occurs), the flow rate monitoring section 323 notifies the session management section 322 of the session having the highest throughput per second. The session management section 322 instructs the packet analysis section 324 to stop the quality measurement of the packets for the session that the flow rate monitoring section 323 has notified the session management section 322 of (S53 of FIG. 4B).

After Step S53, the session management section 322 updates the session management table 325, and the processing flow returns to Step S41 (S54 of FIG. 4B). The session management section 322 in this case updates the session management table 325 by setting the measurement state of the session for which the measurement is finished, specifically, the session having the throughput per second "60" and corresponding to the session ID "002", from "1" meaning "measurement in progress" to "0" meaning "not measured" (see FIG. 6B).

The session whose measurement state has been set to "not measured" is to be measured in the next cycle (see FIG. 6C). This processing is repeated until all sessions have "measurement finished" as their measurement states.

The collection server 3 described above captures the packets from the monitoring location in the monitoring target network, specifies each of the plurality of sessions based on the session specifying information contained in the captured packet, analyzes the packets for each specified session, and measures the quality index. Then, until the predetermined threshold value of the processing capability is reached, the collection server 3 transfers to the aggregation server 2 the quality index for each session, which is measured every predetermined period of time, as the quality measurement results. Moreover, when the predetermined threshold value of the processing capability is exceeded, the collection server 3 stops the measurement of the quality index for the session in the high-load state, and performs the measurement for the stopped session in the next cycle.

With this, the load imposed on the collection server 3 is reduced and a state in which a processing capacity is exceeded owing to the high-load state is prevented, and it is thus possible to realize the collection server 3 that is inexpensive and has a small resource (low specification). A quality deterioration in the monitoring target network occurs continuously, and hence the quality deterioration can be detected through an analysis that ensures that the quality measurement is performed comprehensively.

Effects of Embodiment

According to the disclosed monitoring apparatus, it is possible to achieve a further low-cost monitoring apparatus and ensure that quality measurement is performed comprehensively.

Modified Example

In the one embodiment described above, the throughput is used as the predetermined threshold value of the processing capability, but another quality index such as the data amount may be used. Further, the total throughput per second of the sessions for which the measurement is in progress is used as the condition for determining whether or not the threshold value is exceeded, but in place of this, a processing overflow at the packet accumulation buffer or a CPU usage ratio may be used. In any of those determination methods, one value can be fixedly determined in advance as the threshold value to be used for the determination, but the threshold value may be dynamically changed depending on an operation condition or the like.

The processing of the embodiment described above is provided as a computer-executable program, and can be provided by a non-transitory readable recording medium such as a CD-ROM or a flexible disk or via a communication line.

An arbitrary plurality of or all the processes of the embodiment described above can be selected and combined to be carried out.

What is claimed is:

1. A monitoring apparatus, comprising a memory storing executable instructions; and a processor connected to the memory and configured to execute the instructions, execution of the instructions causes the processor to:
   capture a network transmission signal from a monitoring location in a monitoring target network;
   specify each of a plurality of sessions based on session specifying information contained in the network transmission signal;
   analyze, for specified each of the plurality of sessions, the network transmission signal and measure a quality index;
   transfer the quality index of each of the plurality of sessions, which is measured every predetermined period of time, as a quality measurement result to an aggregation apparatus until a predetermined threshold value of a processing capability is reached; and
   stop, when the predetermined threshold value of the processing capability is exceeded, measuring the quality index of one of the plurality of sessions in a high-load state, and in a next cycle to ensure that measurement is performed comprehensively, perform the measurement on one of the plurality of sessions in the high-load state that stopped the measurement and that a transition of a measurement state has been set from a measurement-in-progress state to a not-measured state.

2. The monitoring apparatus according to claim 1, wherein:
   the memory includes a session management table for storing, for each of captured network transmission signals, a transmission source address, a destination address, a throughput, and the measurement state in association with one another with use of session identification information as key information; and
   the measurement state includes the not-measured state, the measurement-in-progress state, and a measurement-finished state.

3. The monitoring apparatus according to claim 2, wherein:
   the processor learns the each of the plurality of sessions existing in the monitoring target network, acquires transmission source addresses and destination addresses as the session specifying information contained in the each of the captured network transmission signals, and stores the acquired transmission source addresses and the acquired destination addresses in advance in the session management table along with the session identification information; and
   the throughput is set to an initial value and the measurement state is set to the not-measured state.

4. The monitoring apparatus according to claim 2, wherein the processor sequentially sets one of the plurality of sessions having the not-measured state as the measurement state in the session management table as a measurement target session for the quality index, and repeats the measurement of the quality index until measurement states of all measurement target sessions make the transition from the measurement-in-progress state to the measurement-finished state.

5. The monitoring apparatus according to claim 1, wherein the network transmission signal is a packet for operation extracted by a tap, which is inserted and connected between network apparatuses corresponding to a monitoring location in the monitoring target network and branches and extracts the network transmission signal in a replicated state.

6. The monitoring apparatus according to claim 1, wherein:
   the quality index includes a throughput of the network transmission signal; and
   when the network transmission signal is a packet, the throughput is defined by a packet transfer amount.

7. The monitoring apparatus according to claim 1, wherein:
   the predetermined threshold value of the processing capability is a threshold value corresponding to an analyzable throughput of the network transmission signal; and
   when the network transmission signal is a packet, the throughput is defined by a packet transfer amount.

8. A monitoring method by which a processor in a monitoring apparatus executes processing comprising:
   capturing a network transmission signal from a monitoring location in a monitoring target network;
   specifying each of a plurality of sessions based on session specifying information contained in the network transmission signal;
   analyzing, for specified each of the plurality of sessions, the network transmission signal and measure a quality index;
   transferring the quality index of each of the plurality of sessions, which is measured every predetermined period of time, as a quality measurement result to an aggregation apparatus until a predetermined threshold value of a processing capability is reached; and stopping, when the predetermined threshold value of the processing capability is exceeded, measuring the quality index of one of the plurality of sessions in a high-load state, and in a next cycle to ensure that measurement is performed comprehensively, performing the measurement on one of the plurality of sessions in the high-load state that stopped the measurement and that a transition of a measurement state has been set from a measurement-in-progress state to a not-measured state.

9. A non-transitory computer-readable medium, which is recorded with a program that causes a processor in a monitoring apparatus to execute processing comprising:

capturing a network transmission signal from a monitoring location in a monitoring target network;

specifying each of a plurality of sessions based on session specifying information contained in the network transmission signal;

analyzing, for specified each of the plurality of sessions, the network transmission signal and measure a quality index;

transferring the quality index of each of the plurality of sessions, which is measured every predetermined period of time, as a quality measurement result to an aggregation apparatus until a predetermined threshold value of a processing capability is reached; and stopping, when the predetermined threshold value of the processing capability is exceeded, measuring the quality index of one of the plurality of sessions in a high-load state, and in a next cycle to ensure that measurement is performed comprehensively, performing the measurement on one of the plurality of sessions in the high-load state that stopped the measurement and that a transition of a measurement state has been set from a measurement-in-progress state to a not-measured state.

* * * * *